United States Patent
Hui (10) Patent No.: US 6,654,030 B1
(45) Date of Patent: *Nov. 25, 2003

(54) TIME MARKER FOR SYNCHRONIZED MULTIMEDIA

(75) Inventor: Jonathan Hui, Fremont, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/282,577

(22) Filed: Mar. 31, 1999

(51) Int. Cl.[7] ................................................. G09G 5/00
(52) U.S. Cl. ........................................ 345/720; 345/760
(58) Field of Search ................................ 345/719, 720, 345/721, 722, 723, 727, 728, 760, 738

(56) References Cited

U.S. PATENT DOCUMENTS 5,519,828 A * 5/1996 Rayner ........................ 395/326
5,682,326 A * 10/1997 Klingler et al. ............. 361/514
5,760,767 A * 6/1998 Shore et al. ................. 345/328
5,860,073 A   1/1999 Ferrel et al. ................. 707/522

OTHER PUBLICATIONS

"Extensible Markup Language (XML) 1.0", W3C XML Working Group, Feb. 10, 1998, 32 pages.
"Synchronized Multimedia Integration Language (SMIL) 1.0 Specification", W3C XML Working Group, Jun. 15, 1998, 39 pages.

* cited by examiner

Primary Examiner—Kristine Kincaid
Assistant Examiner—Than T. Vu
(74) Attorney, Agent, or Firm—Fitzpatrick, Cella, Harper & Scinto (57) ABSTRACT

A time marker based on extensible mark-up language (XML) for a synchronized multimedia presentation. The time marker defines up to plural text-based elements that, in turn, define entry points other than the beginning of a multimedia presentation and from which the multimedia presentation may be commenced. In connection with a browser-based display of a synchronized multimedia presentation, the browser displays a navigation bar labelled with the text-based elements. Upon user-selection of a text-based element from the navigation bar, the multimedia presentation is re-started commencing at a point corresponding to the navigation entry point.

28 Claims, 8 Drawing Sheets

```
<par>          /-100
    <seq>      /-110
        <video src = "V_1.mpg"/>   /-130
        <video src = "V_2.mpg"/>   /-140
    </seq>     /-111
    <seq>      /-120
        <par>  /-150
            <video src = "V_{31}.mpg"/>   /-170
            <video src = "V_{32}.mpg"/>   /-180
        </par>  /-151
        <seq>  /-160
            <video src = "V_4.mpg"/>   /-190
            <video src = "V_5.mpg"/>   /-200
        </seq>  ~161
    </seq>  ~121
</par>  ~101
```

FIG. 1

$t_0 \longrightarrow t_1$

FIG. 2a

$t_1 \longrightarrow t_2$

FIG. 6C ns defined by SMIL

TIME MARKER FOR SYNCHRONIZED MULTIMEDIA

BACKGROUND OF THE INVENTION

1. Field of the Invention

The present invention relates to the use of extensible mark-up language (XML) based time markers to provide navigation entry points for navigation of a synchronized multimedia presentation.

In particular, the invention concerns label-based navigation for entry points into a multimedia presentation, that allow the user viewing the multimedia presentation to begin the presentation from any of pre-defined entry points defined by the labels which may be text-based, icon-based or image-based.

2. Description of the Related Art

Various mark-up languages have been proposed for use in Internet and Intranet browsing of web-based pages. Currently, the most popular mark-up language is hypertext mark-up language (HTML). HTML defines spatial relationships and visual appearance of a web page when the page is displayed at a user's browser.

One disadvantage of HTML is that it is difficult to display a multimedia presentation using HTML alone. Moreover, it is nearly impossible to synchronize different multimedia presentations within the same web page. Thus, although with HTML it is possible, though difficult, to display a video file, it is nearly impossible to synchronize two different video files for simultaneous display on the same web page.

In response to these shortcomings, the World Wide Web Consortium Working Group on synchronized multimedia has proposed an extensible mark-up language (XML) based language that permits synchronization of multimedia presentations. A proposed standard has been circulated, entitled "synchronized Multimedia Integration Language" (SMIL), version 1.0, the contents of which are incorporated herein by reference. Importantly, the SMIL standard permits both sequential and parallel presentation of multimedia files, thereby permitting synchronization either serially or parallelly of multimedia presentations.

Despite the advantages of the SMIL standard, the standard still only provides for limited user intervention in the multimedia presentation. In particular, it is not now possible, using the SMIL standard, for a user to control the entry point into the multimedia presentation, such that the user can start the multimedia presentation from a desired starting point. Rather, using SMIL, it is only possible for a user to begin the multimedia presentation at the beginning, to fast forward or skip forward through the multimedia presentation, and to stop and to pause it.

SUMMARY OF THE INVENTION

It is therefore an object of the invention to provide XML-based time markers that allow navigation into a synchronized multimedia presentation, such that a user is able to begin the multimedia presentation commencing from any of plural pre-defined text-based entry points.

Thus, in one aspect, the invention is an XML-based time marker that includes, as content thereof, up to plural label-based list elements. The labels may, for example, be text, icons, or images. Each list element, in turn, includes items that correspond to multimedia elements defined by SMIL standard. Each list element corresponds to an entry point in the multimedia elements. Accordingly, each item within a list element defines the entry point of a parallelly-synchronized portion of a SMIL-based multimedia presentation.

In a further aspect of the invention, a SMIL-based browser using a time marker according to the invention responds to an encounter with the time marker as follows. Specifically, upon encountering a time marker element, the browser parses the time marker so as to identify each label-based list element. A user interface is created and displayed, with the user interface including a label corresponding to the labels in each list element. Thus, the user interface may contain text, icons or images, in dependence on the nature of the list elements. In addition, the browser maintains a place holder, such as an internal look-up table corresponding to the entry point in the SMIL-based multimedia presentation, as defined by the items in each list element in the time marker. The browser displays the multimedia presentation according to the SMIL standard. Responsive to user selection of one of the labels in the user interface, the browser causes the multimedia presentation to be synchronized to the entry point corresponding to that list element, and to commence playback of the multimedia presentation from that entry point.

By virtue of the foregoing, a user is able to navigate more readily through a multimedia presentation, by commencing and re-commencing the presentation at any entry point defined in the time marker.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

The present invention is specifically tailored for compatibility with the SMIL specification for multimedia presentations. However, because of the versatility of the invention, particularly in being XML-based, the invention is equally applicable to any XML-based implementation of multimedia presentation systems.

Figure 1:
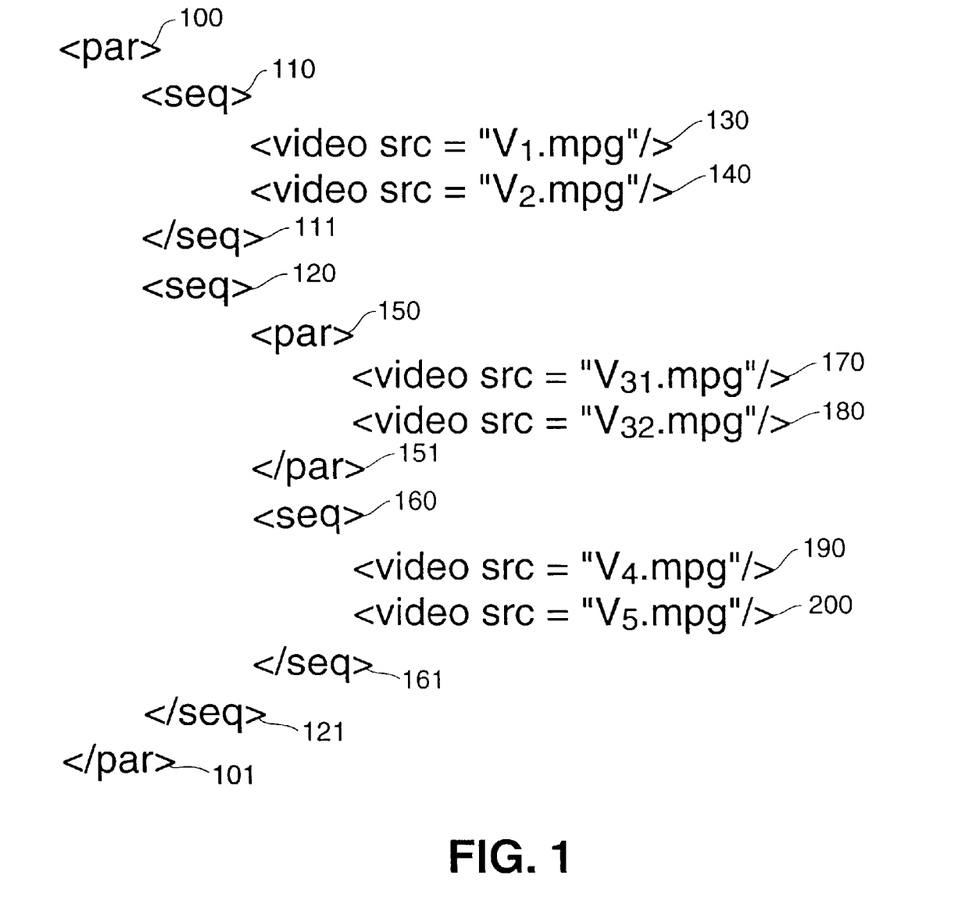
FIG. 1 shows a portion of document source code according to the SMIL 1.0 specification.

FIG. 1 shows an illustrative example of a representative SMIL source file portion utilizing a <par> element, which is used to specify elements to be executed in parallel. The source file portion shown in FIG. 1 begins with <par> element 100 and ends with corresponding </par> notation 101. It should be noted that the <element></element> beginning/end syntax is an XML grammar requirement.

According to the SMIL specification, all child elements nested one level below elements 100 and 101 are to be executed in parallel. Accordingly, since two child elements <seq> 110 and <seq> 120 exist at a first level below <par> element 100, the objects defined by elements 110 and 120 are each executed in parallel.

In the case of <seq> 110, two media object elements exist between <seq> 110 and end notation 111. Also according to the SMIL specification, elements existing as children to a <seq> element are executed sequentially. Accordingly, video statement 130 is processed, followed by video statement 140. It should be noted that statements 130 and 140 each utilize a XML shorthand beginning/end syntax in that end notation "/" is located within the statements declaration.

As described above, child elements to <seq> element 120 are executed in parallel with the child elements of <seq> element 110 by virtue of <par> element 100. Therefore, all elements between <seq> element 120 and notation 121 are processed in parallel with elements 130 and 140. In this regard, nested within element 120 and notation 121 are <par> element 150, corresponding notation 151, <seq> element 160 and notation 161. According to <seq> element 120, the video sources indicated by video statements 170 and 180 are first played in parallel, followed by the video sources of video statements 190 and 200, which are played sequentially.

Figure 2A:
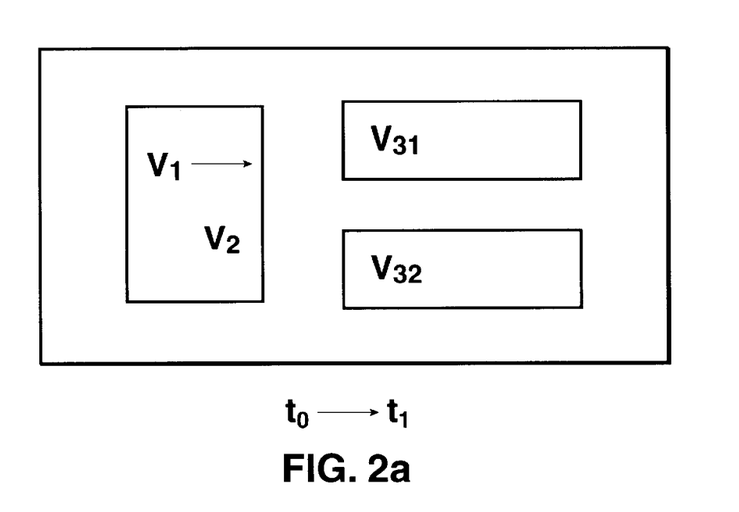
FIG. 2a shows a display of a web browser executing a first part of the FIG. 1 source code.
Figure 2B:
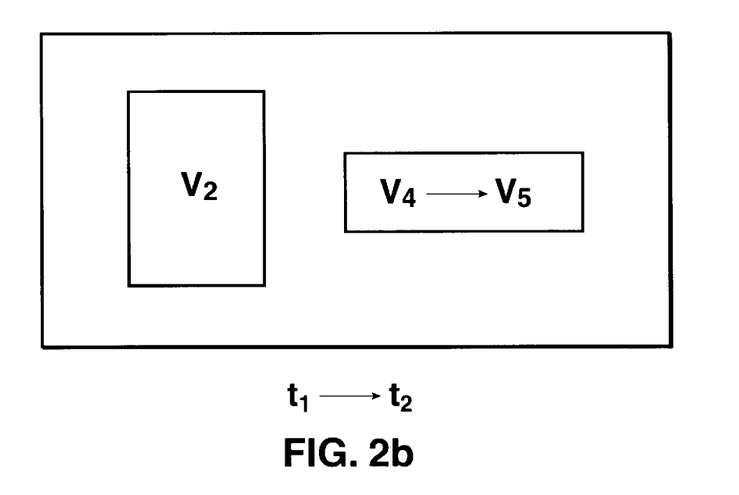
FIG. 2b shows a display of a web browser executing a second part of the FIG. 1 source code.

FIG. 2a and FIG. 2b illustrate a portion of a multimedia presentation governed by the SMIL source file shown in FIG. 1. As shown in FIG. 2a, video $V_1$ begins executing at a same time that video $V_{31}$ and video $V_{32}$ begin executing in parallel. In this example, while either one of video $V_{31}$ or video $V_{32}$ continues to play, video $V_1$ finishes and, by virtue of <seq> element 110, video $V_2$ begins to play. At time $t_1$, the one of video $V_{31}$ and video $V_{32}$ having a longer duration than the other terminates.

Next, as shown in FIG. 2b, video $V_2$ continues to play and, in parallel by virtue of <par> element 100, video $V_4$ begins to play. Video $V_4$ begins to play upon termination of the longer of video $V_{31}$ and $V_{32}$ due to <seq> element 120. After termination of video $V_4$, video VS is played.

Figure 2C:
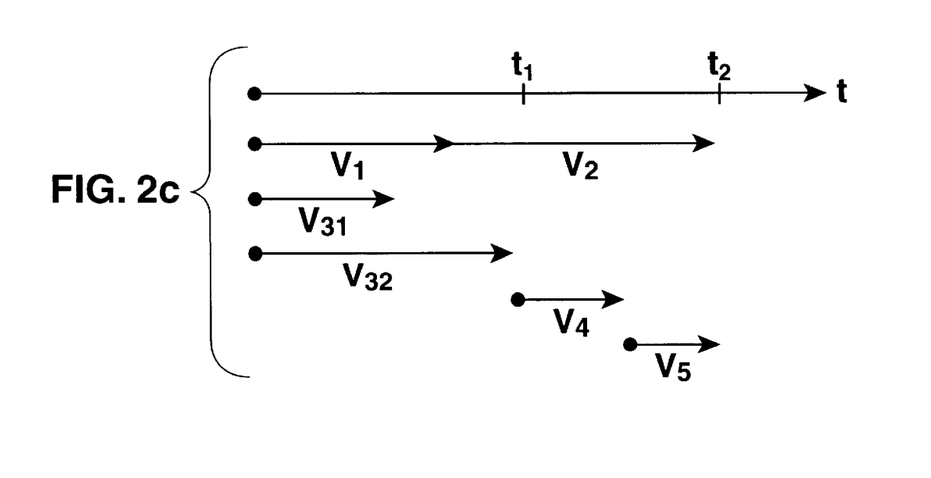
FIG. 2c is a timeline showing temporal relationships of multimedia objects executing according to the FIG. 1 source code.

FIG. 2c shows a timeline describing the presentation illustrated in FIG. 2a and FIG. 2b. It should be noted that FIG. 2c represents only one possible timeline resulting from the FIG. 1 SMIL source file, and that the timeline of FIG. 2c depends heavily upon relative durations of the video sources used therein. As described with respect to FIG. 1, FIG. 2a and FIG. 2b, the timeline of FIG. 2c shows that video $V_1$ and video $V_2$ are played sequentially while video $V_{31}$ and video $V_{32}$ are played in parallel. After termination of $V_{32}$, and while video $V_2$ is playing in parallel, video $V_4$ and video $V_5$ are sequentially played.

The SMIL specification describes a variety of different media object elements which can be used in addition to the representative <video> element of FIG. 1. These elements, which are described in detail in the SMIL specification, include <ref>, <animation>, <audio>, <img>, <video>, <text> and <textstream>. Each of the listed media object elements can also be used with specified attributes which influence their respective functionality.

Figure 3:
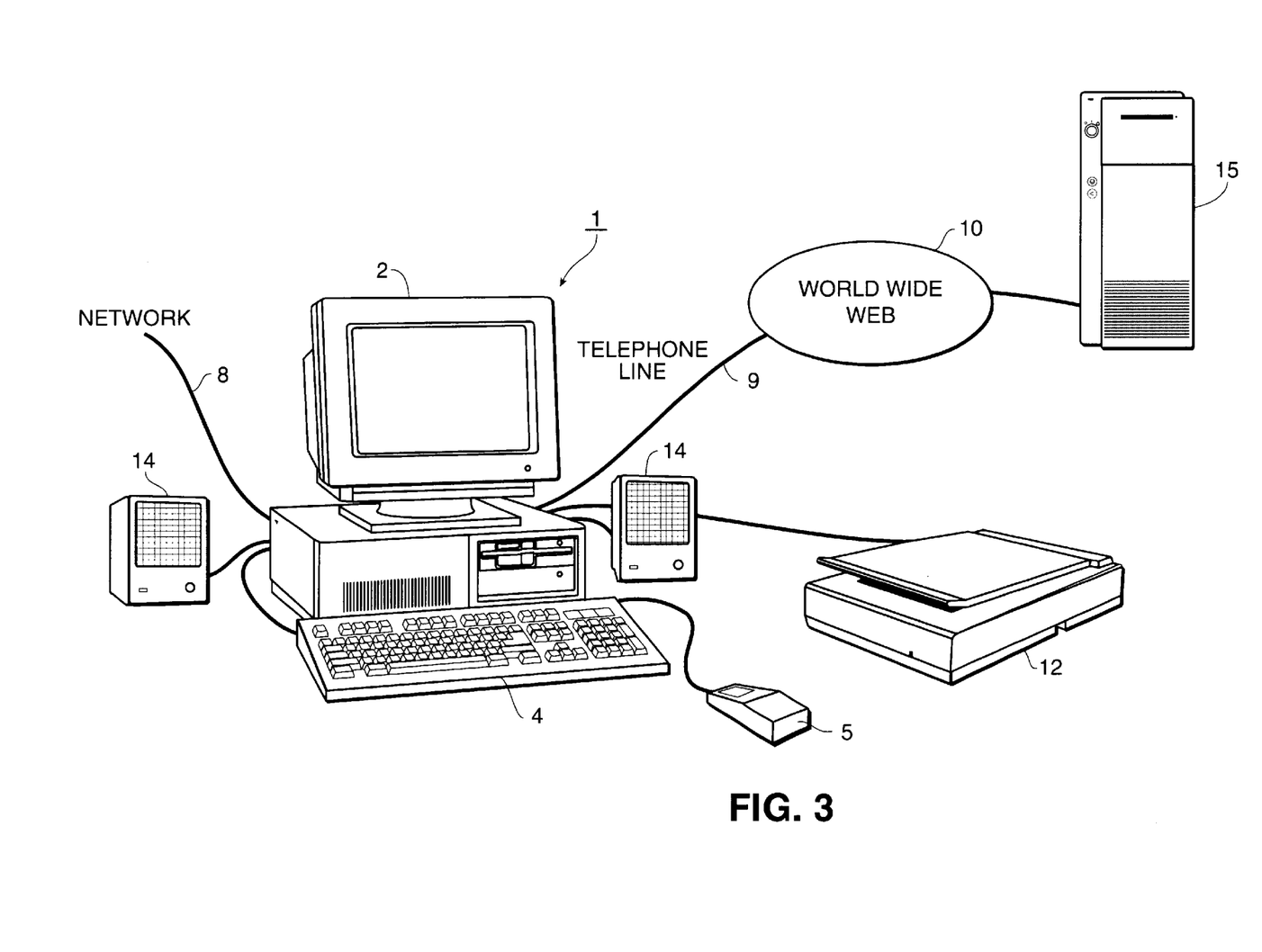
FIG. 3 is an outward view of a computing environment utilizing the present invention.

FIG. 3 is an outward view of a representative computing system utilizing the present invention.

Computing equipment 1 is preferably an Intel® Pentium®-based computer executing a windowing operating system such as Microsoft Windows98®. Computing equipment 1 includes display 2 for displaying images to a user and fixed disk 3 which stores computer-executable process steps of the windowing operating system and of other applications executed by computing equipment 1, such as a World Wide Web browser application. Fixed disk 3 also stores data files and device drivers for use by computing equipment 1. Also provided with computing equipment 1 are keyboard 4 for entering text and commands into appropriate fields displayed on display 2, and pointing device 5, such as a mouse, for pointing to, selecting and manipulating objects displayed on display 2.

Floppy disk drive 6 provides an interface to computing equipment 1 for reading data from and writing data to a floppy disk inserted therein. Using floppy disk drive 6, the above-described computer-executable process steps and/or data files may be input to computing equipment 1 and stored on fixed disk 3. Computer-executable process steps and data files may also be retrieved over a network via network connection 8 or via telephone line 9 from World Wide Web 10. In addition, image data files can be retrieved from scanner 12 and stored on fixed disk 3.

Multimedia speakers 14 provide sound output based on audio data files executed by computing equipment 1. Such an audio file may be in a monaural or stereo format, or in any other type of audio format, so long as computing equipment 1 is provided with a corresponding audio decoder and player application.

Computer-executable process steps and data files obtained by computing equipment 1 over World Wide Web 10 are transferred thereto by servers such as server 15. In response to a request for data, server 15 collects the required data, properly formats the data, and sends the data to computing equipment 1 over World Wide Web 10.

Figure 4:
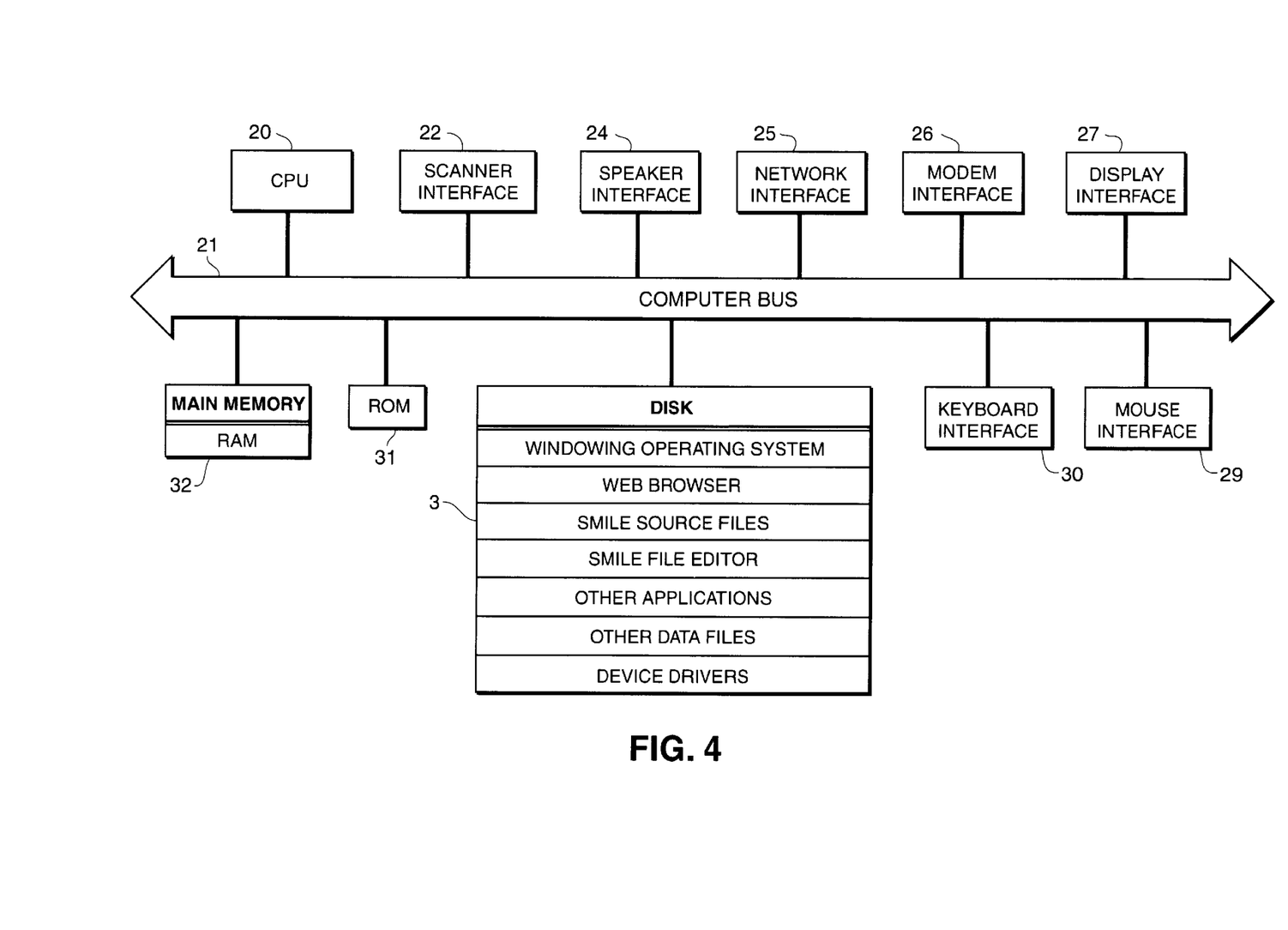
FIG. 4 is a block diagram illustrating the internal architecture of a computer utilizing the present invention.

FIG. 4 is a block diagram of the internal architecture of computing equipment 1. Shown in FIG. 4 is CPU 20, which as described above, is preferably a Pentium® processor. CPU 20 interfaces to computer bus 21, as does scanner interface 22 for interfacing to scanner 12, speaker interface 24 for interfacing to speakers 14, network interface 25 for interfacing to network connection 8, modem interface 26 for interfacing to telephone line 9 and display interface for interfacing to display 2. Mouse interface 29, which interfaces to mouse 5, and keyboard interface 30, which interfaces to keyboard 4, are also connected to bus 21. In this regard, interfaces 22 to 30 allow computing equipment 1 to access the functionality of their corresponding components. Also shown in FIG. 4 is disk 3, having stored thereon the aforementioned windowing operating system, a web browser with capability for displaying XML-based multimedia presentations (for example, by a plug-in), XML-based source files according to the present invention, which, for convenience sake, are hereinafter referred to as Synchronized Multimedia Integration Language Extended (SMILE) source files, a SMILE file editor application, other applications, other data files and device drivers.

The web browser stored on fixed disk 3 is preferably capable of interpreting elements and attributes of a SMILE source file and executing a corresponding multimedia presentation in accordance with functionality dictated by the elements and attributes. For example, Netscape Navigator and Internet Explorer are common HTML-enabled browsers, and a SMIL enabled browser is currently available from RealNetworks.

Read only memory (ROM) 31 stores invariant computer-executable process steps for basic system functions such as basic I/O, start-up routines, or instructions for receiving key strokes from keyboard Main random access memory (RAM) 32 provides CPU 20 with memory storage which can be accessed quickly. In this regard, computer-executable process steps of a web browser or other application are transferred from disk 3 over computer bus 21 to RAM 32 and executed therefrom by CPU 20.

Figure 5:
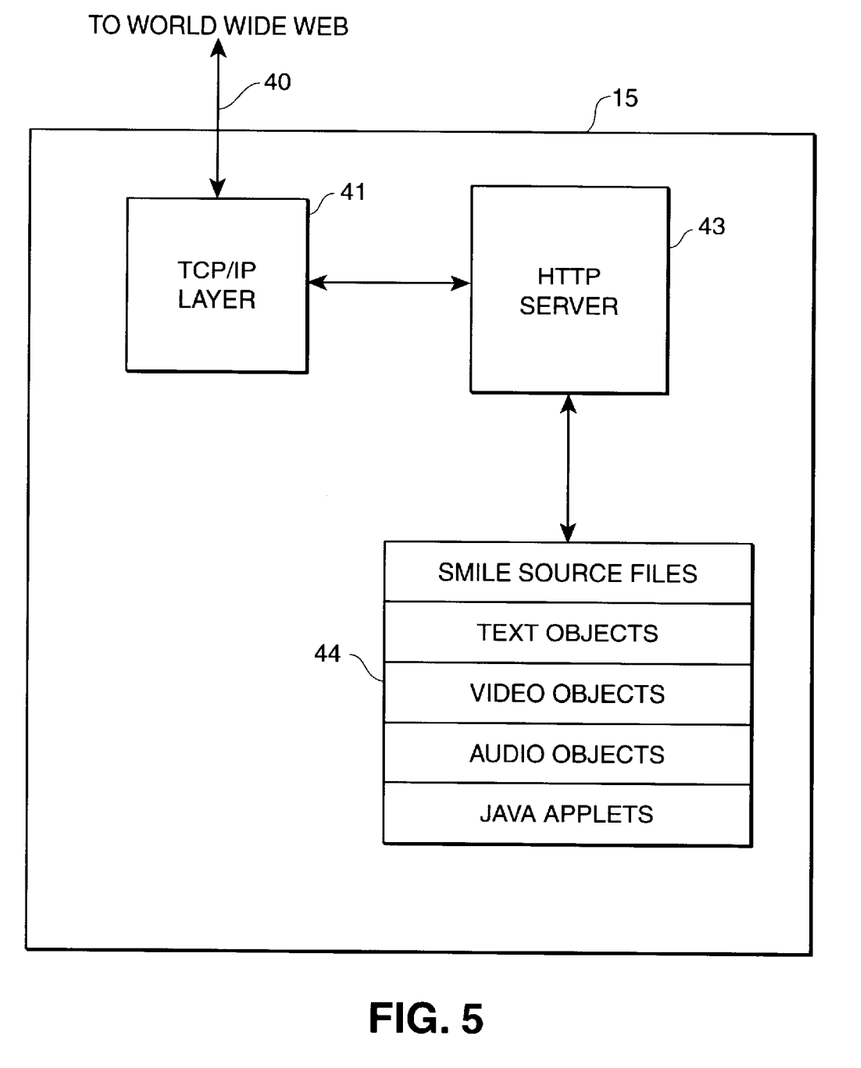
FIG. 5 is a block diagram illustrating the internal architecture of a web server utilizing the present invention.

FIG. 5 is a block diagram of several relevant components internal to server 15. As shown, server 15 is connected to World Wide Web 10 via World Wide Web connection 40, which may be a telephone line, a Ti line, a local area network connection, or the like. In a case that World Wide Web connection 40 connects directly to a local area network, the local area network is preferably connected to a router which, in turn, is connected to World Wide Web 10. In such a configuration, the router includes firewall software for prevention of unauthorized access to the local area network.

Data packets received over World Wide Web 10 (IP packets) travel over connection 40 to TCP/IP layer 41. TCP/IP layer 41 re-orders the IP packets and parses data therefrom. The parsed data is delivered to HTTP (hypertext transfer protocol) server 43. Based on the parsed data, HTTP server 43 retrieves appropriate files from file storage 44 and transfers the files to TCP/IP layer 41. The files are then formatted into IP packets and sent over World Wide Web connection 40 to computing equipment According to the present invention, file storage 44 stores at least source files in a SMILE format according to the present invention, as well as text, video and audio objects which are referenced by stored SMILE source files. File storage 44 may also store Java applets which can be executed by a Java virtual machine of a web browser executing in computing equipment 1.

It should be noted that other servers and protocol layers may be used by server 15. In this regard, although HTTP server 43 and TCP/IP layer 41 are useful for transmitting text and fixed images over a firewall, a specialized streaming server utilizing the TCP or UDP protocol may be preferred for sending streaming audio or video data over World Wide Web 10.

One element transferrable by server 15 to computing equipment 1, in connection with a transfer of SMILE-based files, is a time marker element according to the invention, together with children and sub-children elements that together define the content of the time marker element. The children and sub-children elements are, respectively, a list element which provides text-based lists for display by the time marker element, and an item element, which defines the multimedia presentation items that correspond to particular list elements.

The time marker elements and its list and item children elements are XML-based, and cause the browser to display a user interface that allows users to navigate to different indexed positions within a multimedia presentation. In one representative user interface, the browser displays a graphical representation of a time line together with a slider button that indicates current position within the multimedia presentation. The timeline includes text-based labels obtained from the list child elements of the time marker element. The slider can be user manipulable, such that when the slider is dragged, the browser will modify the current playback position within the SMILE multimedia presentation.

Other user interfaces are also possible. For example, the browser can display a timeline with text-based descriptions derived from the list sub-elements displayed within the timeline. When a user clicks on any one of the text-based descriptions, a multimedia presentation would commence from a point corresponding to the description. The browser can give an indication of current time within the multimedia presentation by highlighting appropriate ones of the text-based descriptions.

Other forms of graphical user interface can also be employed, including, but not limited to drop down controls, radio button controls, tabbed dialog controls, spinner controls, and the like.

In addition, it is possible for the list child elements to specify time-line descriptors for the time marker using non-text based indicators, such as icons or image based indicators.

In general, therefore a time-marker element according to the invention includes one or more list elements, with each list element including a label used in connection with the browser's display of a navigation user interface, and each list element corresponding to an entry point in a synchronized multimedia presentation. Each list element, in turn, includes one or more items each corresponding to a parallelly displayed multimedia element in the multimedia presentation. Each item defines a time offset into its corresponding multimedia element. A browser encountering such a time marker parses the time marker to collect the labels for each list element, so as to be able to create and to display the navigation user interface. In addition, the browser parses all items in each list element, so as to collect time offsets into each visual element in the multimedia display, and so as to be able to commence and re-commence playback of the multimedia presentation starting at the time offsets specified by each list element.

Visual elements flagged by the item elements can include any of the visual elements supported by a multimedia presentation. In connection with SMIL-based multimedia presentations, such visual elements can include, for example, <video>, <animation>, <image>, and <text>.

One specific XML-based format definition for a time marker element, together with XML-based format definitions for the list child element and the item sub-child element, follows:

"Time-Marker" Element Definition:
        <time-marker> </time-marker>
Permissible Attributes:
id          a unique identifier for the <spatial-
              marker> element; usable by other
              SMILE-based elements to refer to this
              element
skip-content   "true" or "false" only; allows for
              compatibility with future versions of
              SMIL
Permissible Children:
        one or more <list> elements only
"List" Element Definition:
        <list> </list>
Permissible Attributes:
id          a unique identifier for the <spatial-
              marker> element; usable by other
              SMILE-based elements to refer to this
              element
skip-content   "true" or "false" only; allows for
              compatibility with future versions of
              SMILE
description    a label utilized by the browser to
              create a navigation user interface.
              Label may be text-based, icon-based,
              or image-based -continued

```
Permissible Children:
        one or more <item> elements only
"Item" Element Definition:
        <item> </item>
Permissible Attributes:
id              a unique identifier for the <spatial-
                marker> element; usable by other
                SMILE-based elements to refer to this
                element
skip-content    "true" or "false" only; allows for
                compatibility with future versions of
                SMILE
item-id         the identification (i.e., id attribute
                of) a visual element in the multimedia
                presentation. Used to specify the id
                of the visual element whose time
                offset is specified by the <item>
                element in question
begin           This attribute specifies the time for
                the explicit begin of an element. The
                attribute can contain the following
                two types of values:
                (a) delay-value
                A delay value is a clock-value
                measuring presentation time.
                Presentation time advances at the
                speed of the presentation. It behaves
                like the time code shown on a counter
                of a tape-deck. It can be stopped,
                decreased or increased either by user
                actions, or by the player itself. The
                semantics of a delay value depend on
                the element's first ancestor that is a
                synchronization element (i.e.,
                ancestors that are "a" or "switch"
                elements are ignored):
                If this ancestor is a "par" element,
                the value defines a delay from the
                effective begin of that element.
                If this ancestor is a "seq" element,
                the value defines a delay from the
                effective end of the first lexical
                predecessor that is a synchronization
                element.
                (b) event-value
                The element begins when a certain
                event occurs. Its value is an
                element-event. The element generating
                the event must be "in scope". The set
                of "in scope" elements S is determined
                as follows:
                1. Take all children from the
                element's first ancestor that is a
                synchronization element and add them
                to S
                2. Remove all "a" and "switch"
                elements from S. Add the children of
                all "a" elements to S, unless they are
                "switch" elements.
                The resulting set S is the set of "in
                scope" elements.
Example 1
        <par>
                <audio id="a" begin=6s" src="audio"/>
                . . .
        </par>
                        par
        |-------------------------|
                        6s
        ←------→|------------------
Example 2
        <seq>
                <audio src="audio1"/>
                <audio begin="5s" src="audio2"/>
        </seq>
                audio      5s      audio
        |---------|←---→|-------------|
```

-continued

```
Example 3
        <par>
                <audio id="a" begin="6s" . . . />
                <img begin="id(a) (4s)" . . . />
        </par>
                        par
        |-------------------------|
                6s              a
        ←---→|-------------------|
                        4s
                        ←--→
                                img
                                |________|
Permissible Children:
        None allowed.
```

NOTE: All <items> in a <list element> must be able to play concurrently, meaning that no <items> in any one <list> can be from the same sequential (<seq>) block. Most preferably, each <item> in any one <list> is from a separate portion of a parallelly executed portion of a parallelly-executed block (a <par>) block.
Any <list> containing <items> that cannot play concurrently is undefined and behavior of the browser is unpredictable.

With the foregoing definition of the time-marker element and its permissible children, it is possible to operate the time-marker element from the binary multimedia data that makes up the multimedia presentation, and also to separate the time-marker element from other XML definitions in the body of the remaining SMIL page. Such separation facilitates editing, and in addition facilitates passing by the browser in its task of parsing the time-marker element and creating the graphical user interface.

One example of use of a time marker element according to the invention is as follows:

```
<header>
    <time-marker>
        <list description="Beginning">
            <item item-id="video1"/>
            <item item-id="video3"/>
        </list>
        <list description="Dinner">
            <item item-id="video2"/>
            <item item-id="video4" begin="5s"/>
        </list>
        <list description="Ceremony">
            <item item-id-"video5"/>
        </list>
    </time-marker>
</header>
<body>
    <seq>
        <par>
            <seq>
                <video id="video1"/>
                <video id="video2"/>
            </seq>
            <seq>
                <video id="video3"/>
                <video id="video4"/>
            </seq>
        </par>
        <video id="video5"/>
    </seq>
</body>
```

In this example, the time marker element defines three separate labels for a navigation user interface displayed by the browser. Each of the labels in this example is text-based, but as explained previously, the labels may also be icon-based or image-based. In any event, upon encountering the time marker element, the browser creates a navigation user interface containing the labels defined by each of the <list> elements, which in this case entail a navigation user interface containing the labels "Beginning", "Dinner", and "Ceremony". Within each <list> element are <items>, with the items specifying a time offset into visual elements of the multimedia presentation. Specifically, the first <list> element, whose description is "Beginning", specifies that the visual elements "video1" and "video3" should be commenced with a zero second time offset, meaning that each of these visual elements should be commenced at their beginnings. The second <list> element, whose description is "Dinner" contain <items> that specify that the "video2" and "video4" visual elements should be commenced, with a time offset into the "video4" visual element of 5 seconds. Finally, the third <list> element, whose description is "Ceremony" contains a single <item> element that indicates that the visual element "lvideo5" should be commenced with a zero second offset. Given the definition of the multimedia presentation, it will be apparent to those of ordinary skill in the art that selection of this third <list> element in the navigation user interface would cause the multimedia presentation to commence from the "video5" visual element, thereby skipping all of "video1" through "video4".

Figure 6A:
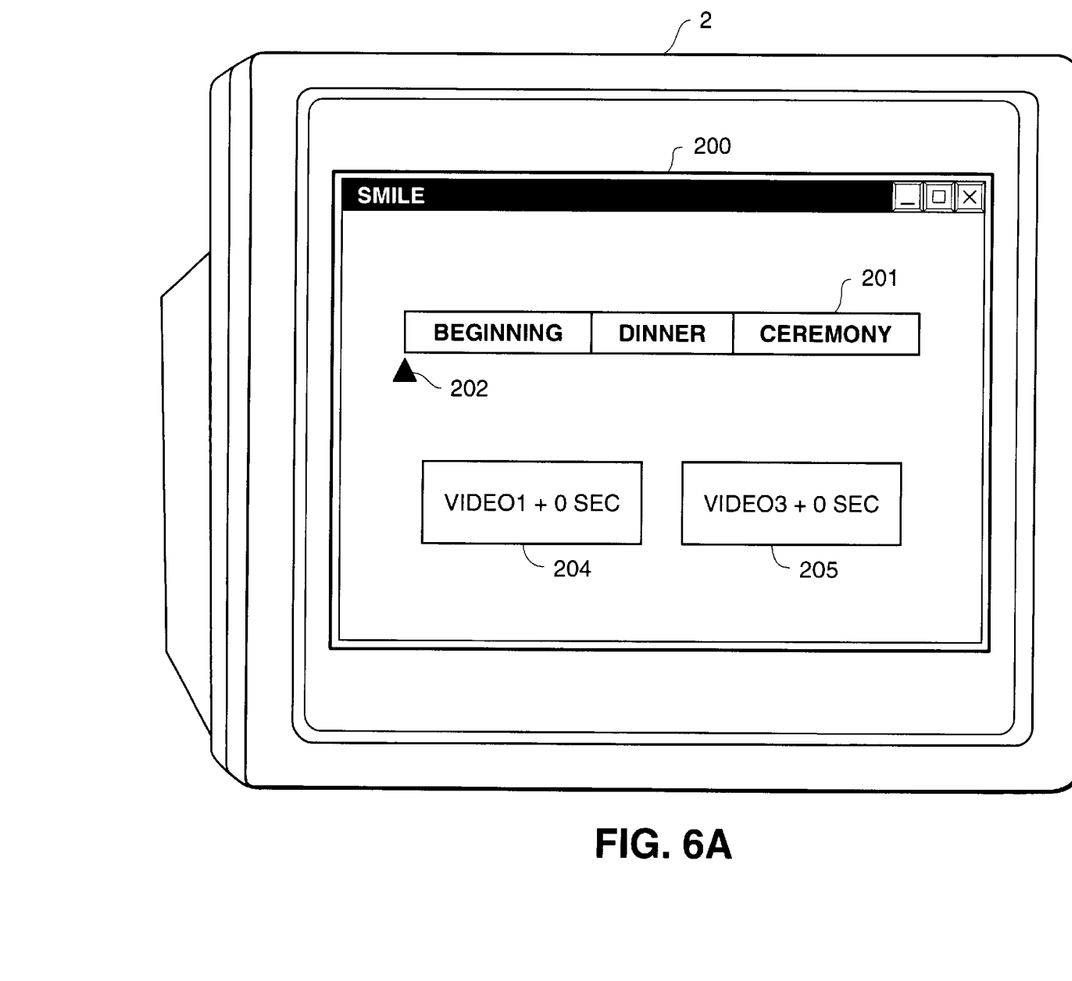
FIGS. 6a through 6c illustrate sequences of a multimedia presentation according to the present invention.
Figure 6B:
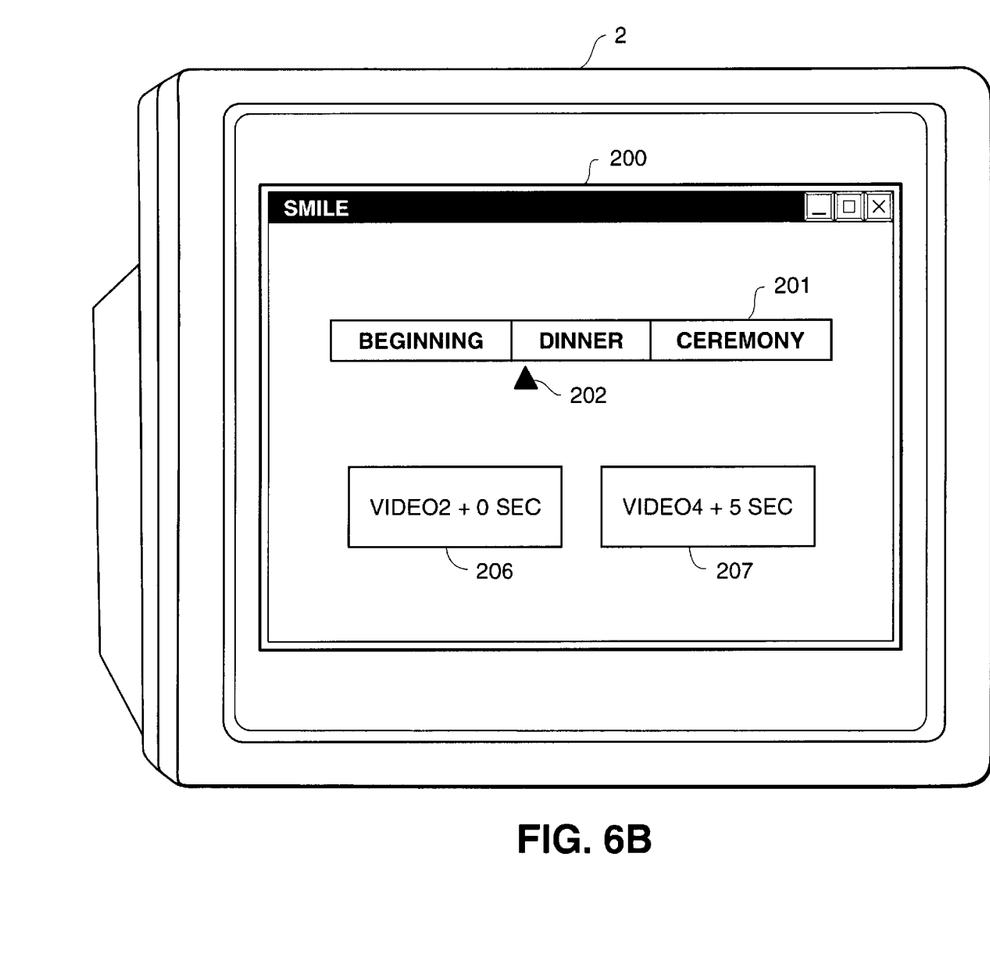
Figure 6C:
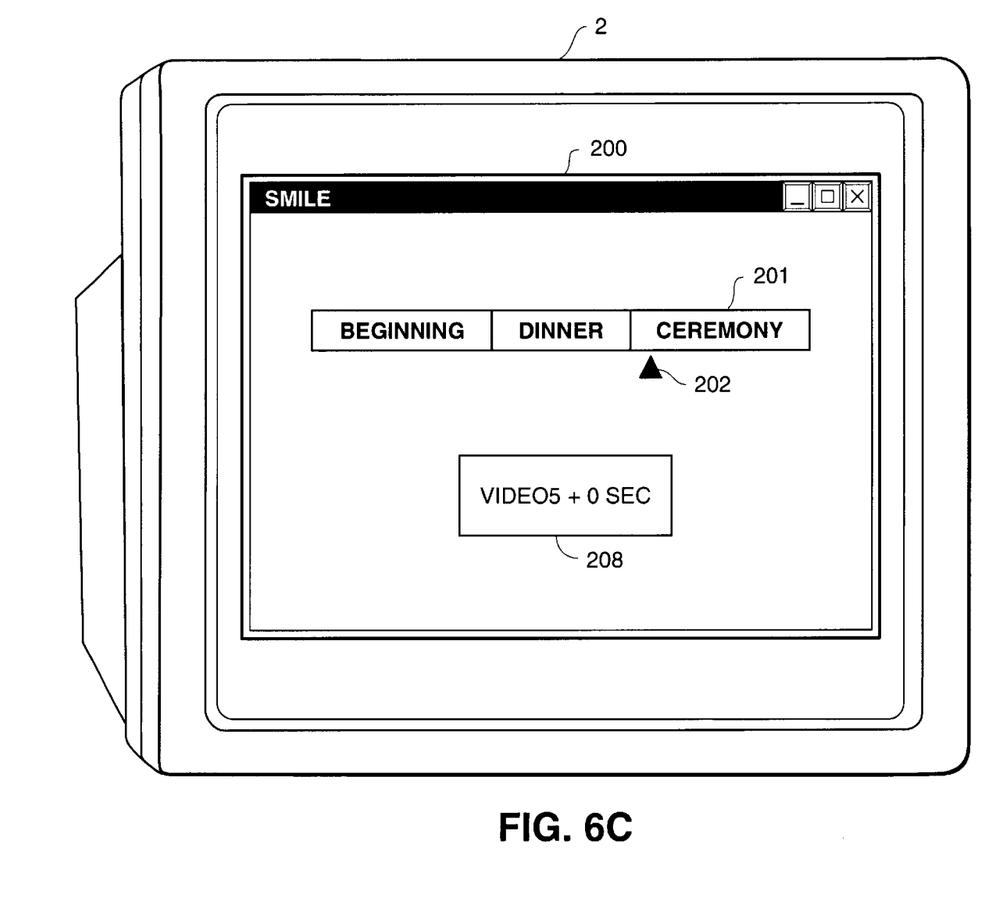

FIGS. 6A through 6C are views showing the display provided on display 2 by a web browser that encounters the above time marker elements in a SMILE-based multimedia document. FIG. 6A shows the appearance of display 2 in correspondence to the <list> element labelled "Beginning", FIG. 6B shows the appearance of display 2 in correspondence to the <list> element labelled "Dinner", and FIG. 6C shows the appearance of display 2 in correspondence to the <list> element labelled "Ceremony".

Thus, as seen in FIG. 6A, upon encountering the time marker element, the browser parses the time marker element to extract all <list> elements so as to create the navigation user interface. As seen in FIG. 6A, the navigation user interface includes a timeline 201 bearing labels corresponding to each <list> element in the time marker element, together with a slider button 202 which indicates the current position within the multimedia presentation and is manipulable by the user so as to select a different position within the timeline of the multimedia presentation. The navigation user interface is displayed by the browser within its browser window 200.

As further seen in FIG. 6A, and in correspondence to the body of the multimedia presentation, two visual elements are currently displayed, namely the "video1" video element and the "video3" video element. In correspondence to position of slider button 202, and as defined by the <item> items within each <list> element, both video elements are currently displayed with a zero second time offset thereinto.

In FIG. 6B, the video presentation has progressed to the second <list> element, or the user has manually dragged slider button 202 to the corresponding position in timeline 201. In correspondence with the body of the multimedia presentation, two video windows are currently being displayed by the browser, namely windows 206 and 207. As shown in FIG. 6B, window 206 includes a video element "video2" and window 207 includes video element "video4". In accordance with each <item> element in the <list> element, there is a zero second offset into "video2" and a five second offset into "video4".

FIG. 6C shows the display of the browser window 200 in correspondence to the third <list> element corresponding to the "Ceremony" label. As shown in FIG. 6C, the multimedia presentation has advanced through "video1" through "video4", so that a single visual element within window 208 is being displayed, namely "video5". Alternatively, the user may have dragged position pointer 202 manually to the position indicated in timeline 201. In correspondence with the <item> element within the third <list> element, the "video5" visual element is displayed with a zero second time offset thereinto.

It will therefore be appreciated that a time marker element has been described with which an XML-based browser for multimedia presentations can parse so as to create and display a navigation user interface, with the navigation user interface allowing a user to selectably access different entry points into a multimedia presentation.

While the present invention is described above with respect to what is currently considered its preferred embodiment, it is to be understood that the invention is not limited to that described above. To the contrary, the invention is intended to cover various modifications and equivalent arrangements included within the spirit and scope of the appended claims.

What is claimed is:

1. An XML-based time marker for multimedia elements in a synchronized multimedia presentation, comprising:

at least one label-based list elements, each list element corresponding to a navigable entry point in user interface for the synchronized multimedia presentation; and at least one item for each list element, each item corresponding to a time offset in a multimedia element in the synchronized multimedia presentation, and each item defining an entry point into its corresponding multimedia element for its respective list element, wherein at least one navigable entry point is other than a beginning of the synchronized multimedia presentation.

2. An XML-based time marker according to claim 1, wherein labels for the label-based list elements are comprised of text-based labels.

3. An XML-based time marker according to claim 1, wherein labels for the label-based list elements are comprised of icon-based labels.

4. An XML-based time marker according to claim 1, wherein labels for the label-based list elements are comprised of image-based labels.

5. An XML-based time marker according to claim 1, wherein the user interface includes a timeline and a user-manipulable pointer.

6. An XML-based time marker according to claim 5, wherein the timeline includes labels from each label-based list element.

7. An XML-based time marker according to claim 1, wherein the user interface is comprised of a timeline labelled with labels from each label-based list element.

8. An XML-based time marker according, to claim 1, wherein each item for each list element is playable concurrently in the synchronized multimedia presentation.

9. An XML-based time marker according to claim 1, wherein the time offset for each multimedia element is defined by a "begin" attribute.

10. An XML-based time marker according to claim 1, wherein the at least one item corresponds to a settable offset into its corresponding multimedia element.

11. In an XML-based browser that displays a multimedia presentation, a method for processing an XML-based time marker that includes label-based list elements each having items that define a time offset into a multimedia element of the multimedia presentation, said method comprising: parsing the time marker so as to identify each label-based list element; displaying a navigation user interface, with the user interface including labels corresponding to the labels in each list element; maintaining an entry point corresponding to each time offset defined by items in each item in the time marker; displaying the multimedia presentation; and responsive to user selection of one of the labels in the user interface, causing the multimedia presentation to be synchronized to the entry point corresponding to the selected list element, and commencing playback of the multimedia presentation from that entry point.

12. A method according to claim 11, wherein labels for the label-based list elements are comprised of text-based labels.

13. A method according to claim 11, wherein labels for the label-based list elements are comprised of icon-based labels.

14. A method according to claim 11, wherein labels for the label-based list elements are comprised of image-based labels.

15. A method according to claim 11, wherein the user interface includes a timeline and a user-manipulable pointer.

16. A method according to claim 15, wherein the timeline includes labels from each label-based list element.

17. A method according to claim 11, wherein the user interface is comprised of a timeline labelled with labels from each label-based list element.

18. A method according to claim 11, wherein each item for each list element is playable concurrently in the synchronized multimedia presentation.

19. A method according to claim 11, wherein the time offset for each multimedia element is defined by a "begin" attribute.

20. A computer-readable medium storing computer executable process steps to process an XML-based time marker that includes label-based list elements each having items that define a time offset into a multimedia element of the multimedia presentation, the process steps comprising:

a parsing step to parse the time marker so as to identify each label-based list element;

a displaying step to display a navigation user interface, with the user interface including labels corresponding to the labels in each list element;

a maintaining step to maintain an entry point corresponding to each time offset defined by items in each item in the time marker;

a displaying step to display the multimedia presentation; and a responding step to respond to user selection of one of the labels in the user interface, causing the multimedia presentation to be synchronized to the entry point corresponding to the selected list element, and commencing playback of the multimedia presentation from that entry point.

21. A computer-readable medium according to claim 20, wherein labels for the label-based list elements are comprised of text-based labels.

22. A computer-readable medium according to claim 20, wherein labels for the label-based list elements are comprised of icon-based labels.

23. A computer-readable medium according to claim 20, wherein labels for the label-based list elements are comprised of image-based labels.

24. A computer-readable medium according to claim 20, wherein the user interface includes a timeline and a user-manipulable pointer.

25. A computer-readable medium according to claim 24, wherein the timeline includes labels from each label-based list element.

26. A computer-readable medium according to claim 20, wherein the user interface is comprised of a timeline labelled with labels from each label-based list element.

27. A computer-readable medium according to claim 20, wherein each item for each list element is playable concurrently in the synchronized multimedia presentation.

28. A computer-readable medium according to claim 20, wherein the time offset for each multimedia element is defined by a "begin" attribute.

* * * * *

UNITED STATES PATENT AND TRADEMARK OFFICE
CERTIFICATE OF CORRECTION

PATENT NO. : 6,654,030 B1
DATED : November 25, 2003
INVENTOR(S) : Jonathan Hui

It is certified that error appears in the above-identified patent and that said Letters Patent is hereby corrected as shown below:

Column 1,
Line 37, ""synchronized" should read -- "Synchronized --.

Column 4,
Line 29, "and-data" should read -- and data --.

Column 5,
Line 2, "keyboard" should read -- keyboard 4. --
Line 26, "equipment" should read -- equipment 1. --

Column 9,
Line 12, "contain" should read -- contains --.
Line 17, "1video5" should read -- "video5" --.

Column 10,
Line 24, "elements," should read -- element, --.
Line 54, "according," should read -- according --.

Signed and Sealed this

Twenty-first Day of September, 2004

JON W. DUDAS
*Director of the United States Patent and Trademark Office*